United States Patent [19]

Limper et al.

[11] Patent Number: 5,245,861
[45] Date of Patent: Sep. 21, 1993

[54] METHOD AND MEASURING DEVICE FOR THE MEASUREMENT OF VISCO-ELASTIC PROPERTIES OF POLYMER MATERIAL

[75] Inventors: Andreas Limper, Wenden-Schönau; Walter Häder, Olpe, both of Fed. Rep. of Germany

[73] Assignee: Werner & Pfleiderer Gummitechnik GmbH, Fed. Rep. of Germany

[21] Appl. No.: 772,560

[22] Filed: Oct. 7, 1991

[30] Foreign Application Priority Data

Oct. 12, 1990 [DE] Fed. Rep. of Germany ....... 4032375

[51] Int. Cl.⁵ .......................................... G01N 11/02
[52] U.S. Cl. ................................................ 73/54.34
[58] Field of Search .............. 73/54.02, 54.14, 54.23, 73/54.28–54.36, 81, 841

[56] References Cited

U.S. PATENT DOCUMENTS

| | | | |
|---|---|---|---|
| 1,748,512 | 2/1930 | Knopf | 73/54.36 |
| 3,365,938 | 1/1968 | Matsushita | |
| 3,822,588 | 7/1974 | Knight et al. | 73/81 |
| 5,078,007 | 1/1992 | Tadros | 73/54.14 |

FOREIGN PATENT DOCUMENTS

| | | |
|---|---|---|
| 7212994 | 7/1972 | Fed. Rep. of Germany . |
| 2706855 | 8/1977 | Fed. Rep. of Germany . |
| 3401904 | 9/1984 | Fed. Rep. of Germany . |
| 3734215 | 4/1989 | Fed. Rep. of Germany . |
| 2742229 | 9/1989 | Fed. Rep. of Germany . |
| 7425936 | 2/1975 | France . |
| 380995 | 6/1973 | U.S.S.R. ............... 73/54.35 |

*Primary Examiner*—Robert Raevis
*Attorney, Agent, or Firm*—Laff, Whitesel, Conte & Saret

[57] ABSTRACT

For the measurement of the visco-elastic properties of a polymer material (69), such as plastics or rubber, a measuring wedge (47) is pressed into a rolled sheet (25) located on a work roll (5) of a mixing mill and conclusions are drawn from the applying forces and from the penetration depth of the measuring wedge onto the visco-elastic properties of the material (69).

13 Claims, 3 Drawing Sheets

METHOD AND MEASURING DEVICE FOR THE MEASUREMENT OF VISCO-ELASTIC PROPERTIES OF POLYMER MATERIAL

FIELD OF THE INVENTION

The invention relates to a method and a measuring device for the measurement of visco-elastic properties of a polymer material, in particular of plastics or rubber, on a mixing mill.

BACKGROUND OF THE INVENTION

As a rule polymer materials, such as plastics or rubbers, cannot be further processed in their pure form. To this effect they have to be mixed with additives, stabilizers and if necessary with fillers. This mixing process can be carried out continuously for example in specially formed extrusion machines, such as double screw extruders, planetary rolling extruders or single screw extruders. In many cases, however, it is recommended to carry out this mixing process on machines, working discontinuously and in batch quantities, and that in particular, if the mixing process is to be extended in time, in order to protect the material. To this effect for example internal mixers working in batch quantities are used. Subsequent to such a mixing process a further mixing process on a mixing mill takes place, on which the mixing process is carried out at a—compared to the mixer—lower temperature and if necessary during reduction of the temperature.

With the continuous and the discontinuous mixing methods the whole material should show constant properties at the end of the mixing process which are narrowly defined. With the continuous mixing method direct access to the material is possible as a rule only at the end of the processing machine, so that a quality control carried out at this place has considerable delays compared with the actual mixing process. In case of mixing the material in kneading machines the actual mixing process is relatively transparent because of the measurement of the actual power taken up by the kneading machine, the measurement of the temperatures and the like. The measurement of special properties of the material, such as viscosity, elasticity etc., however, is not possible during the mixing process. In case of a subsequent mixing process on a roll mill the operator is often able due to his experience to judge subjectively the said material properties, since the material in form of a rolled sheet located on the work roll of the mixing mill is visible. An objective method of measurement working on-line, however, is neither known.

These limited possibilities of the on-line judgement of viscosity and elasticity of the material presents a large problem above all with the processing of rubber, since in this case the raw materials, e.g. natural rubber, are subject to strong fluctuations of the viscosity at the beginning of the mixing process. These different initial viscosities should be reduced to a range as narrow as possible after the mixing process. It is therefore necessary to detect the actual material properties of the material during the mixing process.

There are numerous attempts to draw conclusions from the output data of a kneading machine, i.e. an internal mixer, onto the actual viscosity of the material. Thus it has become known from the EP 0 172 726 B1 to draw conclusions from the actual power draw of the drive of the mixer and from the temperature of the material within the mixer onto the viscosity of the material and above all onto its variation over a period of time. Measuring methods of this type, however, have the drawback that the measured data of the temperature and of the power course are subject to strong fluctuations within the mixer. In this way the power taken up by the drive changes extremely strongly during each rotation of the rotors, and that up to 50%, since such mixers are operated only with a partial filling. During a mixing cycle changes in the power course by up to 220% of the nominal power do occur. If the fluctuations of the power draw during one rotation each are converted by an adequate compensation into a smoothed signal course, the actual values derived herefrom are relatively inaccurate. Especially serious, however, is the insufficient possibility of temperature measurement within the closed mixer. Because of the high viscosity of many materials an appropriate temperature sensor must be very solid and must be dimensioned accordingly. By means of that a comparatively large heat flow can pass from the tip of the temperature sensor to the—as a rule cooled—wall of the mixer. This effect causes errors in the measurement of the temperature, which can be up to ±20° C. As a mixer is constantly operated with a partial filling, the temperature sensor is not surrounded with material during the whole mixing cycle. Above all with very high-viscous materials, such as natural rubber, which have a particularly low filling degree of the mixer, this problem comes extremely to the fore.

SUMMARY OF THE INVENTION

The present invention is based on the basic knowledge that the mixing result can be expected as a result of the mixing procedures within the mixer and on the mixing mill, and that a control and if necessary a correction of the material properties can be carried out in the mixing phase at the end of the mixing cycle on the mixing roll.

Based on this basic knowledge it is the object of the invention to provide a method for the measurement of the visco-elastic properties of a polymer material on a mixing mill and to provide a measuring device to carry out this method.

This object is attained in accordance with the invention by a method for the measurement of visco-elastic properties of a polymer material, in particular of plastics or rubber, on a mixing mill, comprising at least two driveable rolls arranged facing each other by forming a roll gap, the material being arranged on a work roll in form of a rolled sheet, wherein the material of the rolled sheet is conveyed through a measuring gap tapering into the rotational direction of the work roll, which measuring gap is limited by the work roll and a wedge surface of a measuring wedge, said measuring wedge is pressed approximately radially to the axis of said work roll into said rolled sheet and the width of said measuring gap and the forces acting onto said measuring wedge are detected and by a measuring device comprising a measuring wedge, which is advanceable towards said work roll and forming a measuring gap, which is limited by said work roll and a wedge surface of said measuring wedge, and tapering into the rotational direction of said work roll and through which the material of said rolled sheet is conveyed, and at least one of at least one measuring device for the measurement of the forces acting onto said measuring wedge and of a measuring device for the measurement of the penetration depth of said measuring wedge into said rolled sheet with the measuring devices each being connected with said measuring wedge.

In contrast to the temperature distribution of the material within the mixer the temperature distribution in the material located on a mixing mill is much more uniform. This is mainly valid for the temperature in the rolled sheet rotating around the work roll. With regular operation of the mixing mill a material accumulation is formed—in the rotational direction of the rolls before the roll gap—which is a so-called knead. The latter varies in volume and properties. Therefore the expressiveness of integral values, such as gap pressure, driving torque of the rolls and the like has only limited signification for the judgement of the visco-elastic properties of the material. The invention teaches, however, that a measuring device is to be arranged at the rolled sheet. By means of that the measurement of the visco-elastic properties of the material takes always place at a defined temperature, which is essentially constant over the total surface of the rolled sheet. The material is conveyed from the work roll through a measuring gap. This measuring gap has an obviously smaller width than the rolls themselves, so that it can be started out from a reproducable wedge gap filling. The occurring flow forces lead to a radial and tangential excursion of the wedge. The excursions can be measured by suitable measuring methods.

Advantageous details of the invention will become apparent from the dependent claims and the ensuing description of one example of embodiment, taken in conjunction with the drawings.

DESCRIPTION OF THE PREFERRED EMBODIMENT

Figure 1:
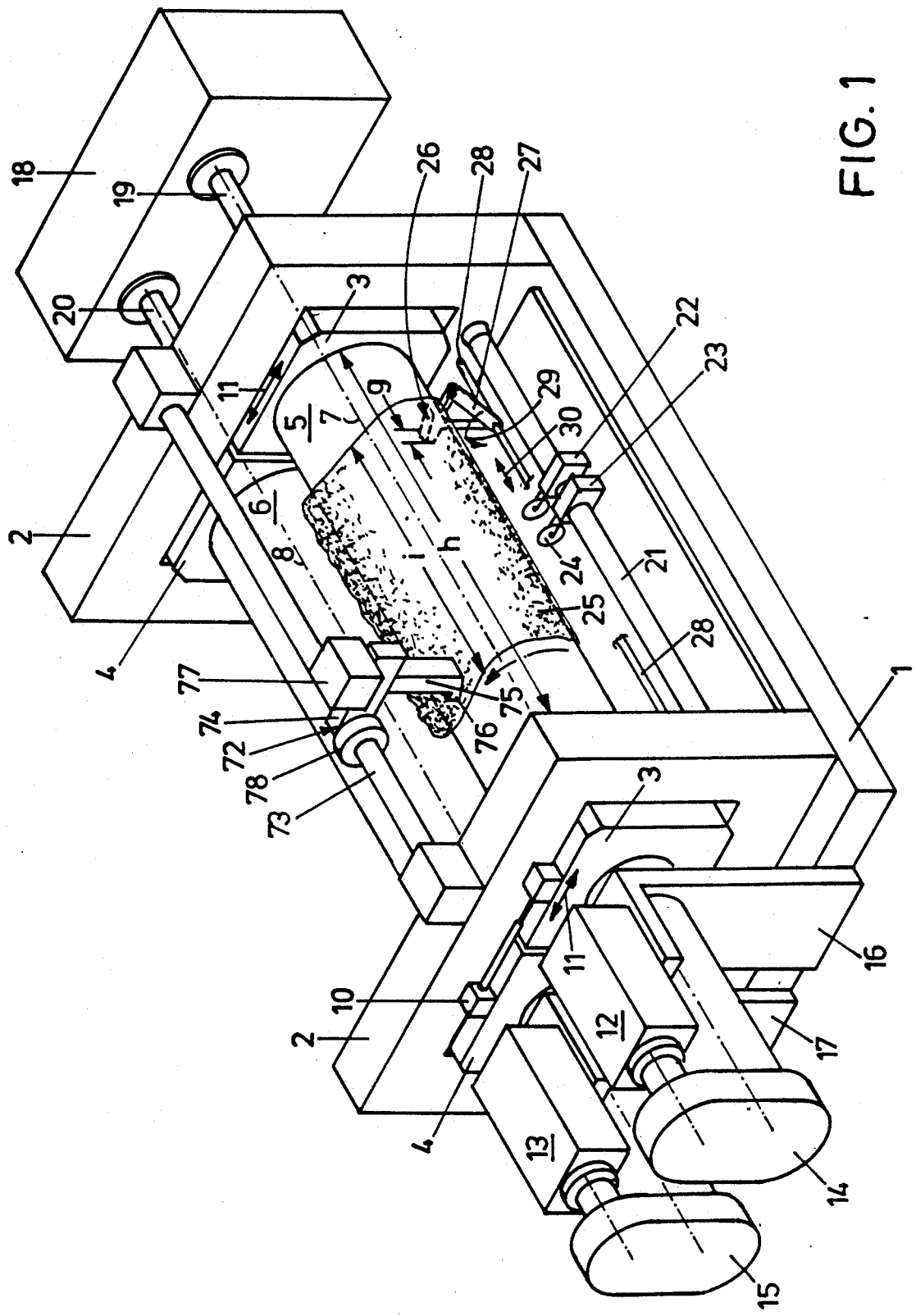
FIG. 1 shows a mixing mill with two different measuring device for the measurement of the visco-elastic properties of a polymer material.

The roll mill shown in FIG. 1 comprises a base frame 1, from which two roll housings 2 project upwards parallel and at a distance to each other. In each roll housing 2 two roll bearings 3, 4 are arranged. In the two pairs of roll bearings 3, 4 two rolls are pivoted, i.e. one work roll 5 shown in FIG. 1 as front roll and one auxiliary roller 6. Both rolls 5, 6 have axes 7, 8 arranged in principle parallel to each other and as a rule in a common horizontal plane. The front roll bearings 3 are displaceable transversely to the axis 7 in the plane defined by the two axes 7, 8, i.e. vertically to the axis 7 and vertically to the axis 8, so that a roll gap 9 only recognizable in FIG. 2 between the rolls 5, 6 is adjustable in its gap width a. The roll gap adjustment is effected by means of a hydraulically driven linear adjustment drive 10, which acts between the two roll bearings 3, 4 respectively associated to each other. The adjustment direction for the work roll 5 is marked by the double-headed arrow 11.

Each roll 5, 6 is driven by an own driving motor 12, 13, to which a gear unit 14, 15 each is associated at the corresponding roll 5 or 6. The driving motors 12, 13 are disposed each on an own bearing bracket 16, 17, which is mounted on the base frame 1. A tempering device 18 is arranged at the side opposite to the driving motors 12, 13, from which tempering device 18 pipes 19, 20 lead on the one hand into the work roll 5 and on the other hand into the auxiliary roller 6, so that the rolls 5, 6 can be tempered. Furthermore in the roll housings 2 a guide rod 21 running parallel to the axes 7, 8 is arranged, on which rod 21 cutting devices 22, 23 are arranged displaceable and lockable and adjustable in distance. These cutting devices 22, 23 carry each a roller knife 24 at their sides facing the work roll 5, by means of which roller knife 24 after completion of a rolling procedure strips can be cut out of a rolled sheet 25 located on the work roll 5. As far as the mixing roll is described up to this point, it is known and marketable and it is known for example from a leaflet "High-performance mixing mills for rubber mixing technology", publishing number FBG 07.01/1-3.0IX.89 KODÖ, of Werner & Pfleiderer GmbH & Co Maschinenbau, D-5905 Freudenberg, Germany.

Figure 2:
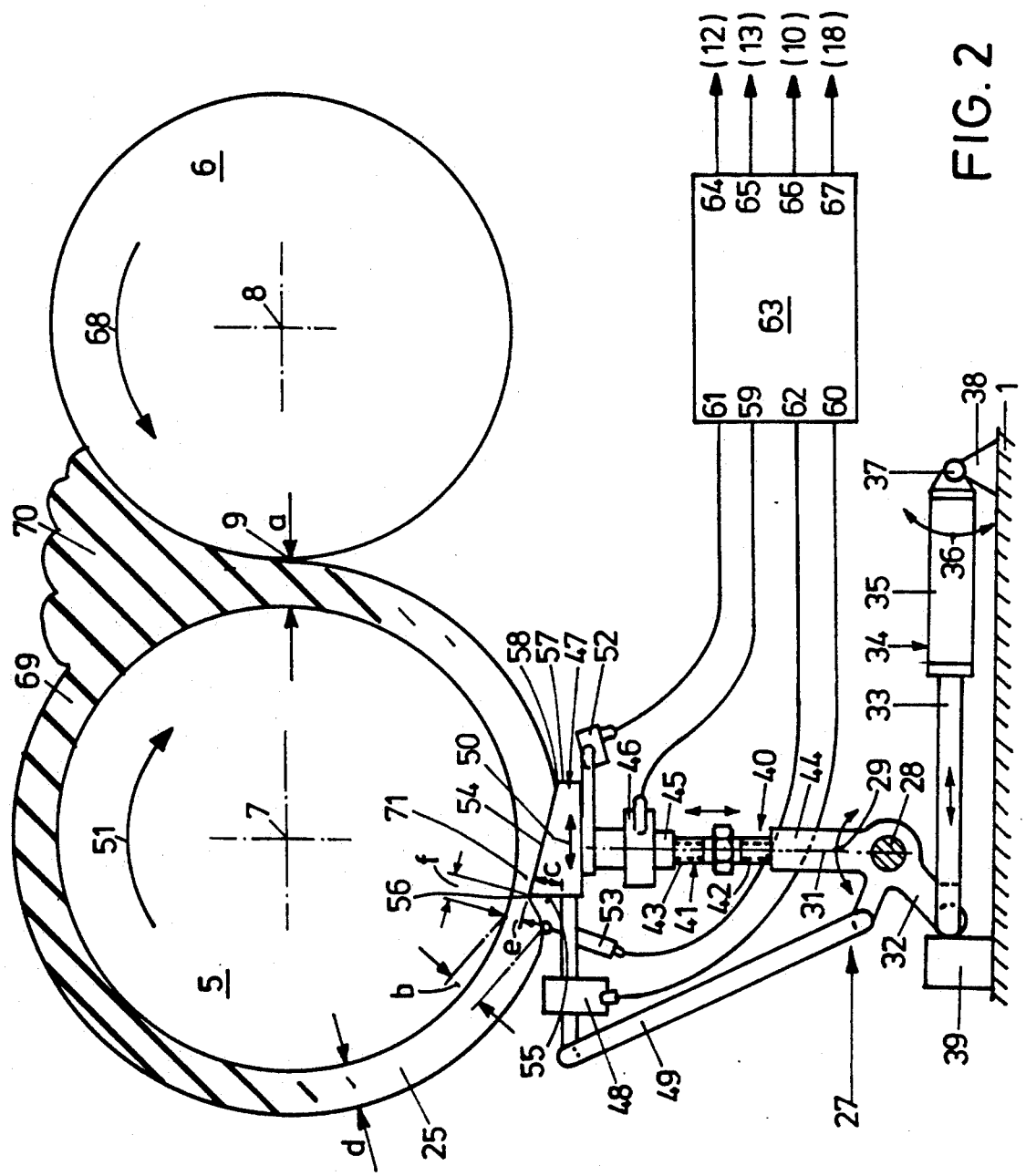
FIG. 2 shows a partial section taken through the mixing mill with a more detailed illustration of a measuring device arranged below the work roll and FIG. 3 shows the measuring principle according to the invention in form of a flow chart.

In FIG. 1 additionally a measuring device 26 for the measurement of physical data of the material of the rolled sheet 25 is outlined, which device 26 is shown more detailed in FIG. 2. It comprises a two-armed lever 27, which is pivoted on a guide rod 28 according to the pivotal direction arrow, the guide rod 28 running parallel to the guide rod 21 and thus parallel to the axes 7 and 8. The guide rod 28 is fixed in the roll housings 2. In addition the lever 27 is disposed displaceable in its longitudinal direction according to the displacement arrow 30 on the guide rod 28. In the advanced lever position shown in FIG. 2 the longitudinal axis 31 of the lever 27 runs radially to the axis 7 of the work roll 5. The two-armed lever 27 has a lower partial lever 32 which is angular to the longitudinal axis 31, on the free end of which a piston rod 33 of a piston cylinder drive serving as feeding drive 34 is hinged. The cylinder 35 of the drive 34 is pivoted on a bearing rod 37 according to the pivtoal direction arrow 36 and parallel displaceable to the guide rod 28, the bearing rod 37 being supported by the bearing brackets 38 on the base frame 1. On the side opposite to the piston rod 33 a stop bar 39 is disposed adjacent to the partial lever 32 on the base frame 1, which predetermines a maximum extension of the piston rod 33. The second partial lever of the two-armed lever 27, forming a main lever 40, is adjustable in its length in the direction of its longitudinal axis 31, and that by means of a spindle 41 with oppositely directed threads 42, 43 engaging in corresponding threaded sleeves 44, 45 of the main lever 40, so that the latter can be adjusted in its length in direction of its longitudinal axis 31.

A force measuring device 46 is supporting on the threaded sleeve 45 facing the work roll 5, measuring forces acting in direction of the longitudinal axis 31 and thus radially to the axis 7. A measuring wedge 47 in turn is supporting on this force measuring device 46, the forces of which acting onto the measuring device 46 in the direction of the longitudinal axis 31 are consequently measured by it. The measuring wedge 47 in turn is supported tangentially to the work roll 5 against a force measuring device 48, which is mounted at the lever 27 by means of supporting arms 49. The force measuring device 48 is arranged in tangential direction 50 to the work roll 5 and —related to the rotational direction 51 of the work roll 5—behind the measuring wedge 47, so that at this place forces acting in tangential direction 50 onto the measuring wedge 47 are measured. The force measuring devices 46, 48 are customary in trade, e.g. so-called load cells, which are working with piezoelectric quartzes, the electric properties of which are changing with their force-dependent deformation. In like manner the measuring devices 46, 48 can work based on tensile measurement strips. The decisive fact is that they show only deformations in the range of a few hundredth of millimeters with the maximum occurring forces, so that the position of the measuring wedge 47 does not change significantly.

Furthermore at the main lever 40 additionally a temperature measuring device 52 and a distance measuring device 53 are arranged. The temperature measuring device 52 detects the temperature at the surface of the rolled sheet 25. It can be for example an infrared measuring device. The distance measuring device 53 measures radially to the axis 7 of the work roll 5 the thickness b of the rolled sheet 25—related to the rotational direction 51—behind the measuring wedge 47. The measuring wedge 47 has a wedge surface 54, which runs under an angle c to the tangential direction 50 in such a manner, that the wedge surface 54—in the direction of the rotational direction 51—is inclined towards the work roll 5. The tip 56 formed at the end of the measuring wedge 47, the end of which follows the rotational direction 51, between the side wall 55 of the measuring wedge 47 located at that place and the wedge surface 54 is pressed into the rolled sheet 25 to carry out measurements. Between the side wall 57, moving ahead related to the rotational direction 51, of the measuring wedge 47 and the wedge surface 54 an inlet section 58 is formed, immersing under no measuring conditions into the rolled sheet 25.

The respective measuring data are passed from the measuring devices 46, 48, 52, 53 via lines to the inputs 59, 60, 61, 62 of a control device 63, in which the measuring data are detected and processed and from which control signals are passed via control outputs 64, 65, 66, 67 to the driving motors 12, 13, to the adjustment drive 10 and to the tempering device 18.

The mode of operation is as follows:

The work roll 5 rotates in the rotational direction 51. The auxiliary roller 6 rotates counterclockwise in the rotational direction 68. As the material 69 to be treated a polymer material, such as plastics or rubber or in particular natural rubber, is put onto the work roll 5, which material is already pretreated in a mixer. Consequently additives, other mixing ingredients, fillers and the like have been added to the mixer and have been mixed in there, with a relatively high degree of homogenisation already being attained. The mixing should be continued on the mixing mill in a protective manner and at a reduced temperature compared to the temperature within the mixer. In this connection the material is put onto the work roll 5 in form of the said rolled sheet 25. At the roll gap 9 the rotational direction 51, 68 of the two rolls 6, 7 is directed downwards, so that a so-called knead is formed before the roll gap 9, i.e. above it, which consequently is a material accumulation 70. This material is constantly picked up by the roll gap 9 during the rotation of the rolls, while another material in turn passes from the rolled sheet 25 to the material accumulation 70, i.e. a constant exchange of material takes place between the rolled sheet 25 and the material accummulation 70. The average thickness d of the rolled sheet 25 is essentially determined by the gap width a of the roll gap 9.

The regular mixing process was started, without the measuring wedge 47 being put in its advanced position, i.e. it was in a position swung out of the way, in which the piston rod 33 has moved into the cylinder 35. In order to carry out measurements, the drive 34 is driven hydraulically so that the piston rod 33 is extended. By means of that the measuring wedge 47 is pivoted to the measuring position shown in the drawing, the position of the measuring wedge 47, in which its longitudinal axis 31 runs accurately radially to the axis 7, being predetermined by the stop bar 39. The length adjustment of the lever 27 has been able to be carried out before. The spindle 41, however, can be adjusted in its length also in the advanced position of the measuring wedge 47, by means of which the distance e of the tip 56 to the work roll 5 is changed. Such changes of this distance e can be carried out also during the measurements.

The material 69 is conveyed into the measuring gap 71 which is formed between the wedge surface 54 and the work roll 5, tapering to the rotational direction 51 and thus being wedge-shaped. In the inlet section 58 of the measuring gap 71 a complex current profile is formed, which results from the visco-elastic properties of the material, the dragging speed, the geometric conditions and the material temperature. The occurring flow forces are measured by the force measuring devices 46, 48 in the described manner and are given on the control device 63. The temperature of the material is measured directly before the measuring gap 71 by means of the temperature measuring device 52. The thickness b of the rolled sheet 25 is measured by means of the distance measurement device 53 at a predetermined distance f in the rotational direction 51 behind the tip 56, i.e. behind the narrowest position of the measuring gap 71, thus by comparing thickness b with the distance e of the tip 56 to the work roll 5 a measure for the elasticity of the material is being gained.

Through the force measurements by means of the measuring devices 46, 48 the sum of effects of the tensile deformation and the shearing deformation applied on the material 69 in the measuring gap 71 is detected. The tensile deformation results from the elastic properties of the material 69, while the shearing deformation results from the viscous properties of the material 69. In order to distinguish the viscous from the elastic material properties for a reliable recognition of mischarges, a measurement for the elastic properties of the material 69 is gained by means of the distance measuring device 53.

From the measured values control signals are derived, by means of which the rotational speed of the work roll 5 is regulated on the one hand. In like manner a rotational speed of the auxiliary roller 6 which deviates herefrom is controlled. The proportion of the rotational speeds of the two rolls 5, 6 to each other, which deviates usually from 1 with such mixing mills, is called friction, the different circumferential speeds of the two rolls 5, 6 from each other being decisive, in order to obtain in the roll gap 9 a high load and revolution of the material 69 in the rolled sheet 25 by the relative speed of the rolls 5, 6 against each other. Furthermore the gap width a of the roll gap 9 is adjusted according to the measuring results, and that by an appropriate control of the adjustment drives 10. The tempering device 18 is controlled, in order to increase or reduce the temperature of the rolls 5, 6 if necessary.

Usual gap widths a for the roll gap 9 are—as far as the adjustability is concerned—between 0.5 and 50 mm, whereas the usual operational gap widths a are between 0.5 and 5 mm. The distance e of the tip 56 to the roll 5, i.e. the width of the measuring gap 71 at its narrowest position is 30 to 90% and preferably 50 to 70% of the gap width a.

A modified measuring device 72 is outlined in FIG. 1, naturally only one measuring device 26 or one measuring device 72 being available. This measuring device 72 is provided above the axes 7, 8. It has a guide rod 73 arranged on the roll housings 2 and running parallel to the axes 7, 8, on which rod 73 a pivotable lever 74 is disposed, which runs approximately horizontally. At this lever 74 a support 75 is arranged, which runs approximately radially to the axis 7 of the work roll 5, at the end of which facing the work roll 5 a measuring wedge 76 is arranged, which is formed in like manner as the measuring wedge 47. On the lever 74 a weight 77 is arranged, so that the measuring wedge 76 is pressed into the rolled sheet 25 with a predetermined force. An angle measuring device 78 is arranged on the guide rod 73, by means of which device 78 angle changes of the lever 74 can be measured, and thus in turn the distance of its tip to the work roll 5 is measured. While the example of embodiment according to FIG. 2 works with a firmly adjusted measuring gap 71 and the thus occurring forces are measured, in this embodiment the forces are kept constant by means of the weight 77, and the dimension of the measuring gap is detected. A temperature measuring device and a distance measuring device for the detection of the elasticity of the material can be provided in like manner as in the example of embodiment according to FIG. 2.

If the two rolls 5, 6 are not driven by an own driving motor 12, 13 each, but by a common driving motor, the output 65 of the control device 63 can pass to an adjustable gear unit, by means of which the friction between the rolls 5, 6 can be changed.

Figure 3:
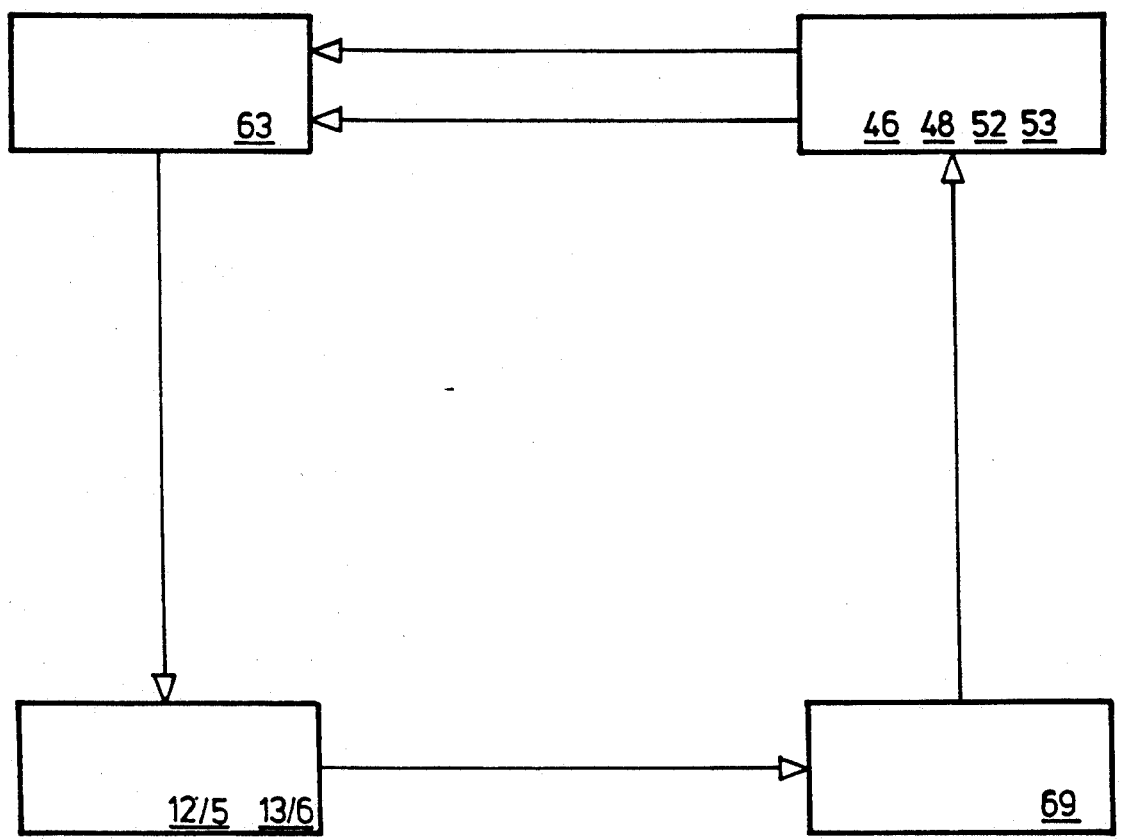

In FIG. 3 the principle of the on-line detection of the physical data of the material 69 and its use to control the mixing mill and to change the set-point values for the preceding mixing process within the internal mixer is illustrated again clearly and diagrammatically.

The extension g of the measuring wedge 47 and in like manner of the measuring wedge 76 in the direction of the axes 7, 8 is much more smaller than the length h of the rolls 5, 6 in the direction of their axes 7 or 8. Thus the extension g is also considerably smaller than the length i of the rolled sheet 25 located on the roll 5. The extension g is in the range of 1 to 15% of the length h.

What is claimed is:

1. A method for the measurement of visco-elastic properties of a polymer material on a mixing mill, comprising a work roll (5) and at least one further driveable roll (6), which are arranged facing each other by forming a roll gap (9), the material (69) being arranged on the work roll (5) in form of a rolled sheet (25), wherein
the material (69) of the rolled sheet (25) is conveyed through a measuring gap (71) tapering into the rotational direction (51) of the work roll (5), which measuring gap (71) is limited by the work roll (5) and a wedge surface (54) of a measuring wedge (47, 76),
said measuring wedge (47, 76) is pressed approximately radially to the axis (7) of said work roll (5) into said rolled sheet (25), and
the width (e) of said measuring gap (71) and the forces acting onto said measuring wedge (47, 76) are detected.

2. A method according to claim 1, wherein
said measuring wedge (47) is pressed into said rolled sheet (25) up to a predetermined width (e) of said measuring gap (71) and
the forces of said rolled sheet (25) radially acting onto said measuring wedge (47) are detected.

3. A method according to claim 1, wherein
said measuring wedge (47) is pressed into said rolled sheet (25) up to a predetermined width (e) of said measuring gap (71) and
the forces of said rolled sheet (25) acting tangentially onto said measuring wedge (47) are detected.

4. A method according to claim 1, wherein
said measuring wedge (76) is pressed into said rolled sheet (25) with a predetermined force and
the width of said measuring gap (71) is detected.

5. A measuring device for measurement of visco-elastic properties of a polymer material on a mixing mill, which comprises at least two driveable rolls (5, 6) arranged facing each other by forming a roll gap (9), the material (69) being arranged on a work roll (5) in form of a rolled sheet (25), said measuring device comprising
a measuring wedge (47), which is advanceable towards said work roll (5),
a measuring gap (71), which is limited by said work roll (5) and a wedge surface (54) of said measuring wedge (47) and tapering into a rotational direction (51) of said work roll (5) and through which the material of said rolled sheet (25) is conveyed, and
a force measuring device (48) for the measurement of forces acting onto said measuring wedge (47) with the force measuring device (48) being connected with said measuring wedge (47), wherein said measuring wedge (47) is supported against said force measuring device (48) for the measurement of forces acting onto said measuring wedge (47) tangentially to said work roll (5).

6. A measuring device according to claim 5, wherein said measuring wedge (47, 76) has an extension (g) in the direction of an axis (7) of said work roll (5), which extension (g) corresponds to approximately 1 to 15% of a length (h) of said work roll (5).

7. A measuring device according to claim 5, wherein said measuring wedge (47, 76) is arranged on a pivoted lever (27, 74), which can be pivoted to a position in which it is advanced towards said work roll (5) approximately radially to said axis (7) of said work roll (5).

8. A measuring device according to claim 7, wherein said measuring wedge (47) is adjustable radially to said axis (7) of said work roll (5).

9. A measuring device according to claim 7, wherein said lever (74) is arranged above said work roll (5) and is loaded with a weight (77) of a predetermined dimension.

10. A measuring device according to claim 9, wherein an angle measuring device (78) is associated to said lever (74).

11. A measuring device according to claim 5, wherein said measuring wedge (47) is advanceable to a position approximately radially to said axis (7) of said work roll (5) by means of an advancing drive (34).

12. A measuring device according to claim 5, wherein said measuring wedge (47) is supported against a force measuring device (46) for the measurement of forces acting onto said measuring wedge (47) radially to said axis (7) of said work roll (5).

13. A measuring device according to claim 5, being adjustable in the direction to said work roll (5).

* * * * *